US009863306B2

United States Patent
Fedewa

(10) Patent No.: US 9,863,306 B2
(45) Date of Patent: Jan. 9, 2018

(54) ENGINE RESTART AID

(71) Applicant: DELPHI TECHNOLOGIES, INC., Troy, MI (US)

(72) Inventor: Andrew Fedewa, Clarkston, MI (US)

(73) Assignee: DELPHI TECHNOLOGIES, INC., Troy, MI (US)

(*) Notice: Subject to any disclaimer, the term of this patent is extended or adjusted under 35 U.S.C. 154(b) by 248 days.

(21) Appl. No.: 14/605,179

(22) Filed: Jan. 26, 2015

(65) Prior Publication Data

US 2016/0215678 A1    Jul. 28, 2016

(51) Int. Cl.
| | |
|---|---|
| F01P 7/14 | (2006.01) |
| F02B 29/04 | (2006.01) |
| F01P 3/20 | (2006.01) |
| F01P 3/18 | (2006.01) |
| F01P 5/10 | (2006.01) |
| F01P 7/16 | (2006.01) |
| F02M 26/06 | (2016.01) |
| F02M 26/23 | (2016.01) |

(52) U.S. Cl.
CPC ............ F02B 29/0443 (2013.01); F01P 3/20 (2013.01); F01P 7/165 (2013.01); F01P 7/14 (2013.01); F01P 7/16 (2013.01); F01P 7/167 (2013.01); F01P 2003/182 (2013.01); F01P 2005/105 (2013.01); F01P 2060/02 (2013.01); F02M 26/06 (2016.02); F02M 26/23 (2016.02)

(58) Field of Classification Search
CPC ...... F01P 7/16; F01P 7/14; F01P 7/167; F01P 2007/146; F01P 3/20

USPC ........................................................ 123/41.08
See application file for complete search history.

(56) References Cited

U.S. PATENT DOCUMENTS

| | | | | |
|---|---|---|---|---|
| 2009/0314847 | A1* | 12/2009 | Nemoto | B60H 1/00764 237/5 |
| 2010/0236502 | A1* | 9/2010 | Watanabe | B60K 6/48 123/41.02 |
| 2012/0125593 | A1* | 5/2012 | Kakehashi | F01P 3/20 165/287 |
| 2012/0186775 | A1* | 7/2012 | Fraser | B60W 10/06 165/41 |

(Continued)

FOREIGN PATENT DOCUMENTS

FR    2978206 A1 *  1/2013  ............. F01P 7/165

*Primary Examiner* — Jacob Amick
*Assistant Examiner* — Charles Brauch
(74) *Attorney, Agent, or Firm* — Joshua M. Haines

(57) ABSTRACT

A system is disclosed comprising an engine having coolant passages defined therethrough, a first coolant pump, and a first radiator. The system additionally comprises a second coolant pump, a second radiator, and a liquid-to-air heat exchanger configured to condition the temperature of intake air to the engine. The system further includes a coolant valve means. For a first configuration of the coolant valve means the first coolant pump is configured to urge coolant through the coolant passages in the engine and through the first radiator, and the second coolant pump is configured to urge coolant through the liquid-to-air heat exchanger and through the second radiator. For a second configuration of the coolant valve means the second coolant pump is configured to urge coolant through the coolant passages in the engine and through the liquid-to-air heat exchanger. A method for controlling the system is also disclosed.

5 Claims, 4 Drawing Sheets

(56) References Cited

U.S. PATENT DOCUMENTS

2013/0068202 A1\* 3/2013 Kardos ................... F01P 3/20
123/563

\* cited by examiner

ENGINE RESTART AID

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

Gasoline Direct-injection Compression-Ignition (GDCI) is an engine combustion process that shows promise in improving engine emissions performance and efficiency. GDCI provides low-temperature combustion for high efficiency, low NOx, and low particulate emissions over the complete engine operating range. Low-temperature combustion of gasoline may be achieved using multiple late injection (MLI), intake boost, and moderate EGR. GDCI engine operation is described in detail in U.S. Patent Application Publication No. 2013/0213349A1, the entire contents of which are hereby incorporated herein by reference.

The autoignition properties of gasoline-like fuels require relatively precise control of the thermal state within each combustion chamber to achieve compression ignition and to maintain robust combustion in each individual cylinder of a multiple-cylinder engine. Since there is no spark to initiate the combustion process, the in-cylinder conditions must be correct for auto-ignition. A system and method for conditioning intake air to a GDCI engine is described in U.S. Patent Application Publication No. 2013/0298554A1, the entire contents of which are hereby incorporated herein by reference.

In order to save fuel, it is known to implement engine stop-start strategies, in which the engine is stopped when the vehicle is stopped (i.e. when the engine would otherwise be operated at idle speed), and restarted when vehicle motion is desired. To improve starting performance of a GDCI engine, it is often desirable to increase the temperature of the intake air charge to the engine while starting, as described in U.S. patent application Ser. No. 14/068,278 titled "COLD START STRATEGY AND SYSTEM FOR GASOLINE DIRECT INJECTION COMPRESSION IGNITION ENGINE", the entire contents of which are hereby incorporated herein by reference. Conventional means for increasing intake air temperature such as electric heaters are relatively slow, making them impractical for start-stop operation of a GDCI engine. Accordingly, an alternative way to provide heat to the intake air charge usable during start-stop operation is desired.

BRIEF SUMMARY OF THE INVENTION

In a first aspect of the invention, a system is disclosed comprising an engine having coolant passages defined therethrough, a first coolant pump, and a first radiator. The system additionally comprises a second coolant pump, a second radiator, and a liquid-to-air heat exchanger configured to condition the temperature of intake air to the engine. The system further includes a coolant valve means. For a first configuration of the coolant valve means a first coolant loop is defined wherein the first coolant pump is configured to urge coolant through the coolant passages in the engine and through the first radiator, and a second coolant loop is defined wherein the second coolant pump is configured to urge coolant through the liquid-to-air heat exchanger and through the second radiator. For a second configuration of the coolant valve means a third coolant loop is defined wherein the second coolant pump is configured to urge coolant through the coolant passages in the engine and through the liquid-to-air heat exchanger.

In a second aspect of the invention a method of operating a system is disclosed, where the system includes an engine having coolant passages defined therethrough, a first coolant pump, and a first radiator. The system additionally comprises a second coolant pump, a second radiator, and a liquid-to-air heat exchanger configured to condition the temperature of intake air to the engine. The system further includes a coolant valve means. For a first configuration of the coolant valve means a first coolant loop is defined wherein the first coolant pump is configured to urge coolant through the coolant passages in the engine and through the first radiator, and a second coolant loop is defined wherein the second coolant pump is configured to urge coolant through the liquid-to-air heat exchanger and through the second radiator. For a second configuration of the coolant valve means a third coolant loop is defined wherein the second coolant pump is configured to urge coolant through the coolant passages in the engine and through the liquid-to-air heat exchanger. The method for operating the system includes the steps of placing the coolant valve means into the first configuration when the engine is running, and placing the coolant valve means into the second configuration when the engine is stopped.

DETAILED DESCRIPTION OF THE INVENTION

Figure 1:
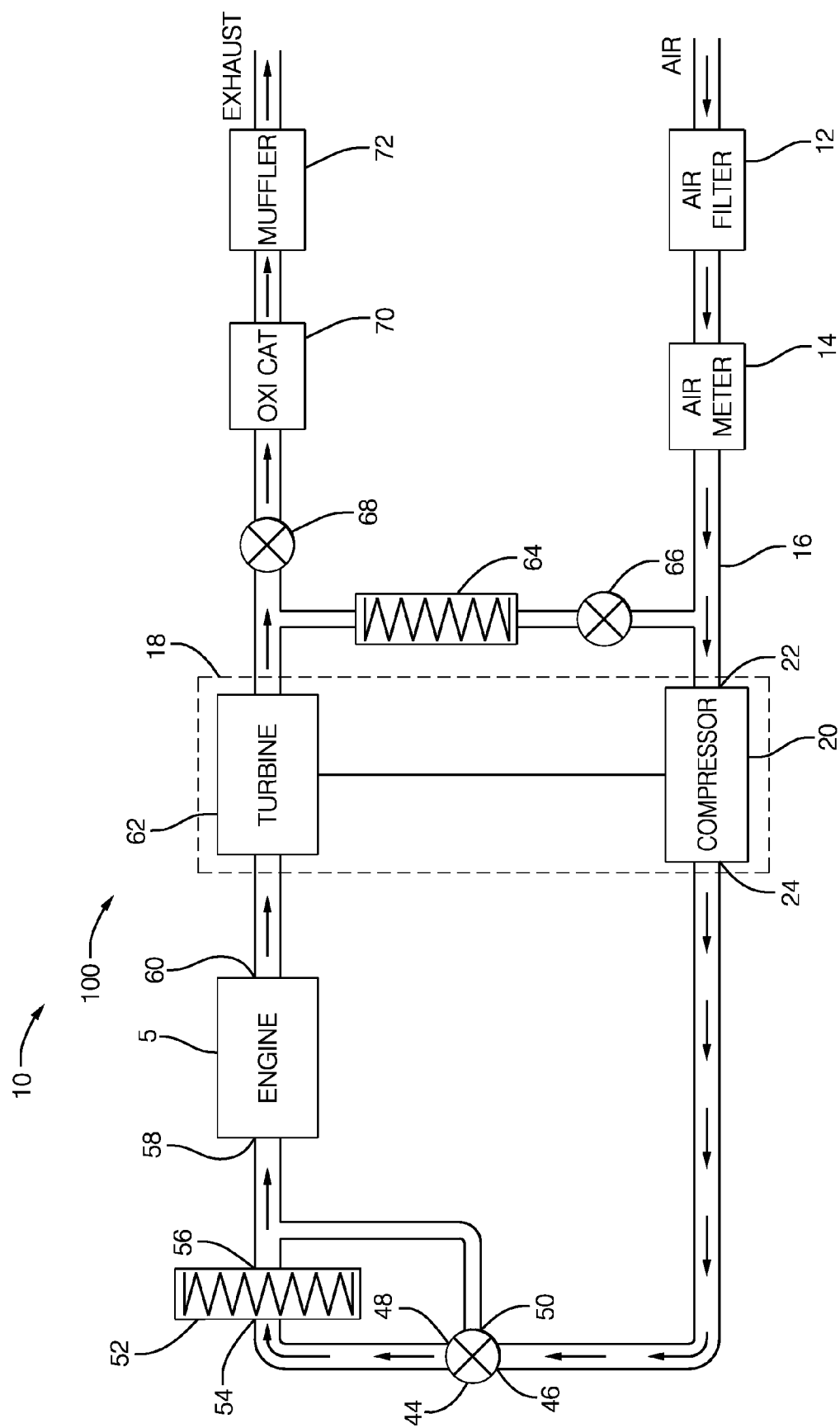
FIG. 1 is a depiction of the gas side of a system for conditioning intake air into a turbocharged engine.

FIG. 1 illustrates the gas side 100 of a system 10 for conditioning intake air into an engine 5 having a turbocharger boost system. Referring to FIG. 1, air passes through an air filter 12 and a mass airflow sensor 14 into an air duct 16. The air duct 16 channels air into the air inlet 22 of the compressor 20 of a turbocharger 18. Air is then channeled from the air outlet 24 of the compressor 20 to the air inlet 46 of a charge air cooler bypass valve 44. The charge air cooler bypass valve 44 in FIG. 1 allows air entering the first port 46 to be controllably channeled to the second port 48, to the third port 50, or to be blended to both the second port 48 and to the third port 50. Air that is channeled through the second port 48 of the charge air cooler bypass valve 44 enters an air inlet port 54 of a charge air cooler 52, through which the air passes by way of an air outlet port 56 of the charge air cooler 52 to the charge air intake port 58 of the engine 5. Air that is channeled through the third port 50 of the charge air cooler bypass valve 44 passes directly to the charge air intake port 58 of the engine 5 without passing through the charge air cooler 52.

Still with reference to FIG. 1, engine exhaust gas exits an exhaust port 60 of the engine 5 and is channeled to the turbine 62 of the turbocharger 18. Exhaust gas exiting the turbine 62 can follow one of two paths. A portion of the exhaust gas may pass through an EGR cooler 64 and an EGR valve 66, to be reintroduced into the intake air stream at air duct 16. The remainder of the exhaust gas that is not recirculated through the EGR system passes through a backpressure valve 68, a catalytic converter 70, and a muffler 72, to be exhausted out a tail pipe.

Figure 2:
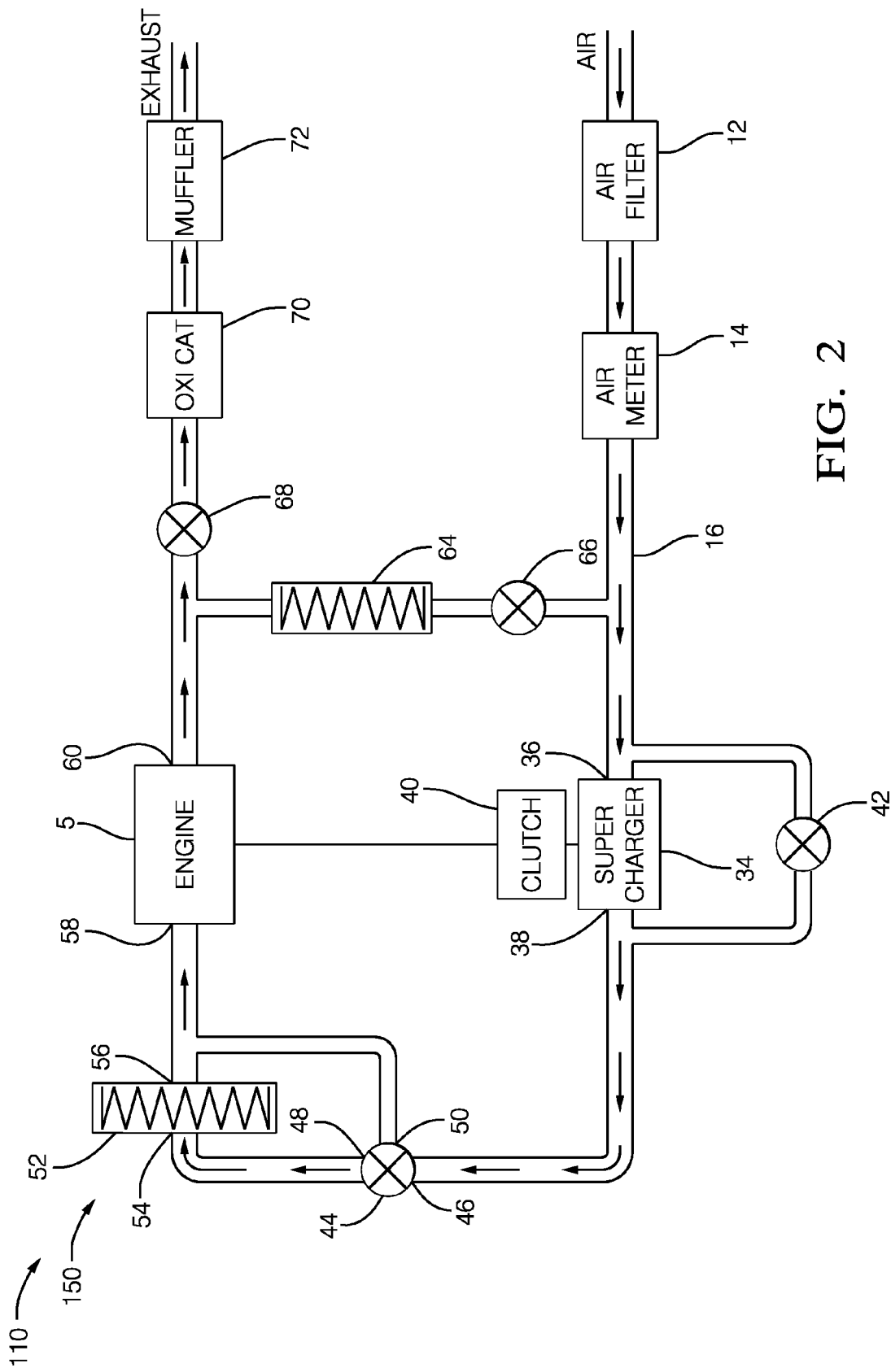
FIG. 2 is a depiction of the gas side of a system for conditioning intake air into a supercharged engine.

FIG. 2 illustrates the gas side 150 of a system 110 for conditioning intake air into an engine 5 having a supercharger boost system. The embodiment of FIG. 2 is similar to the embodiment of FIG. 1, the main difference being that the intake air pressure is boosted by a supercharger 34 driven by the engine 5 through a clutch 40 in the embodiment of FIG. 2, whereas boost is achieved using the turbocharger 18 in the embodiment of FIG. 1. Referring to FIG. 2, air passes through an air filter 12 and a mass airflow sensor 14 into an air duct 16. The air duct 16 channels air into the air inlet 36 of a supercharger 34. A controllable supercharger bypass valve 42 is provided to optionally route air around the supercharger 34. Air is then channeled from the air outlet 38 of the supercharger 34 to the air inlet 46 of a charge air cooler bypass valve 44. The charge air cooler bypass valve 44 in FIG. 2 allows air entering the first port 46 to be controllably channeled to the second port 48, to the third port 50, or to be blended to both the second port 48 and to the third port 50. Air that is channeled through the second port 48 of the charge air cooler bypass valve 44 enters an air inlet port 54 of a charge air cooler 52, through which the air passes by way of an air outlet port 56 of the charge air cooler 52 to the charge air intake port 58 of the engine 5. Air that is channeled through the third port 50 of the charge air cooler bypass valve 44 passes directly to the charge air intake port 58 of the engine 5 without passing through the charge air cooler 52.

Still with reference to FIG. 2, engine exhaust gas exits an exhaust port 60 of the engine 5. Exhaust gas exiting the exhaust port 60 can follow one of two paths. A portion of the exhaust gas may pass through an EGR cooler 64 and an EGR valve 66, to be reintroduced into the intake air stream at air duct 16. The remainder of the exhaust gas that is not recirculated through the EGR system passes through a backpressure valve 68, a catalytic converter 70, and a muffler 72, to be exhausted out a tail pipe.

It will be appreciated from the foregoing description of FIGS. 1 and 2 that the focus of FIGS. 1 and 2 is on the transport and conditioning of gas constituents, i.e. air into the engine 5 and exhaust gas out of the engine 5. Some of the components in FIGS. 1 and 2 affect the temperature and/or the pressure of the gas flowing through the component. For example the turbocharger compressor 20 and the supercharger 34 can increase both the temperature and the pressure of air flowing therethrough. The charge air cooler 52 and the EGR cooler 64 are each heat exchangers that affect the temperature of the gas (air or exhaust gas) flowing therethrough by transferring heat from the gas to another medium. In the embodiments of FIGS. 1 through 4, the other heat transfer medium is a liquid coolant, discussed in further detail in relation to FIGS. 3 and 4.

Figure 3:
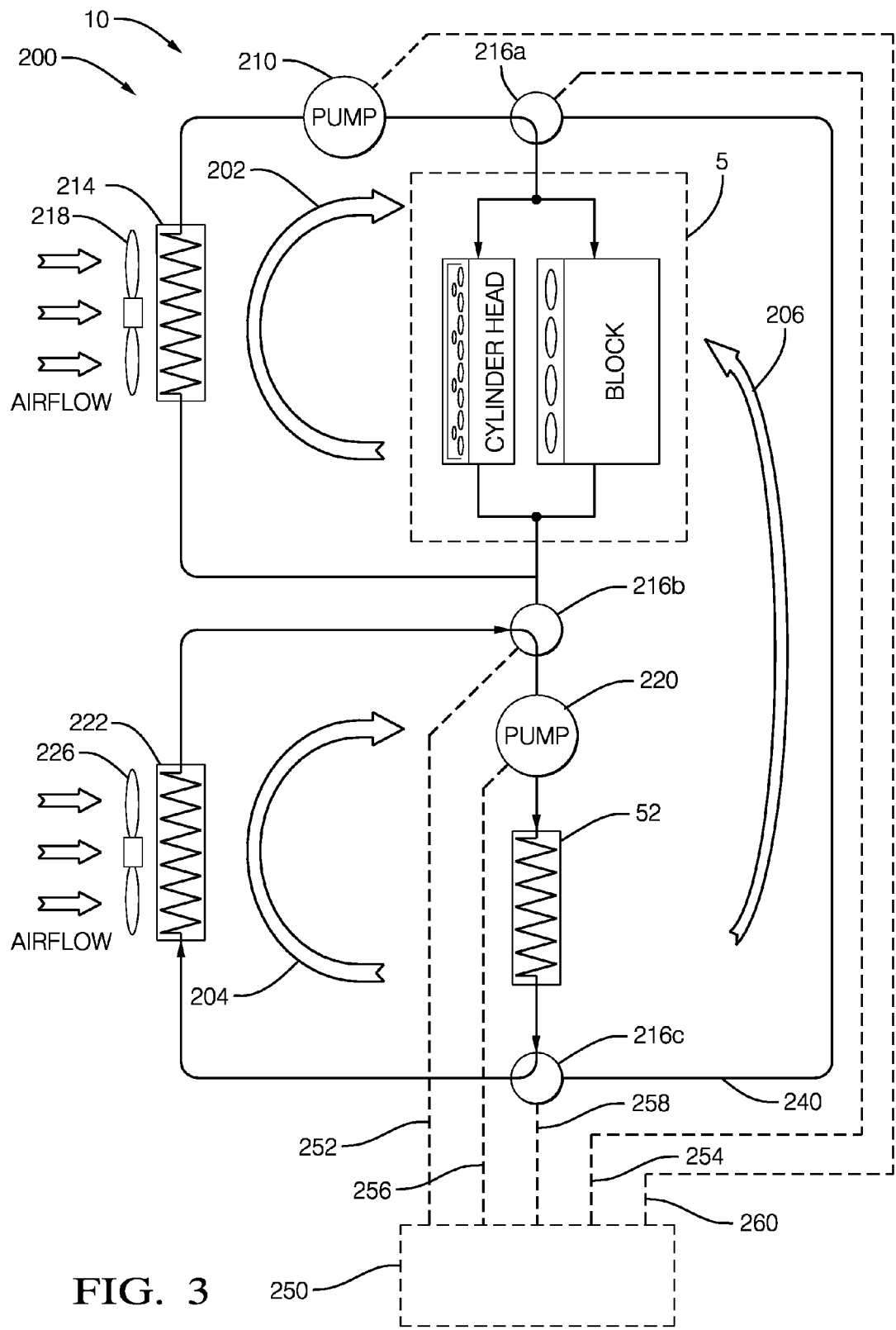
FIG. 3 is a depiction of a coolant system including a coolant valve means in a first configuration.

FIG. 3 depicts the coolant side 200 of the system 10 for conditioning intake air into an engine 5 according to a first aspect of the present invention. FIG. 3 includes several components such as the engine 5 and the charge air cooler 52 that were previously discussed with respect to their functions in the gas sides 100, 150 of the systems depicted in FIGS. 1 and 2. The coolant system may further include the EGR cooler 64, an oil cooler, a heater core, temperature sensing device, pressure sensing device, a thermostat, and/or other components not shown in FIG. 3.

Referring to FIG. 3, the coolant side 200 of the system 10 for conditioning intake air includes a first coolant loop 202. The first coolant loop 202 includes a first coolant pump 210 configured to urge liquid coolant through coolant passages in the cylinder head and the block of the engine 5, a first radiator 214, and a first three-way coolant valve 216a, the function of which will be described later. The first coolant pump 210 may conveniently be a mechanical pump driven by rotation of the engine 5. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 2, the coolant side 200 of the system 10 further includes a second coolant loop 204. The second coolant loop 204 includes a second coolant pump 220 configured to urge liquid coolant through a second radiator 222, the charge air cooler 52, and a second three-way coolant valve 216b, and a third three-way coolant valve 216c. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214.

The system 10 further includes a conduit 240 fluid tightly connecting a port of the first three-way coolant valve 216a to a port of the third three-way coolant valve 216c.

Figure 4:
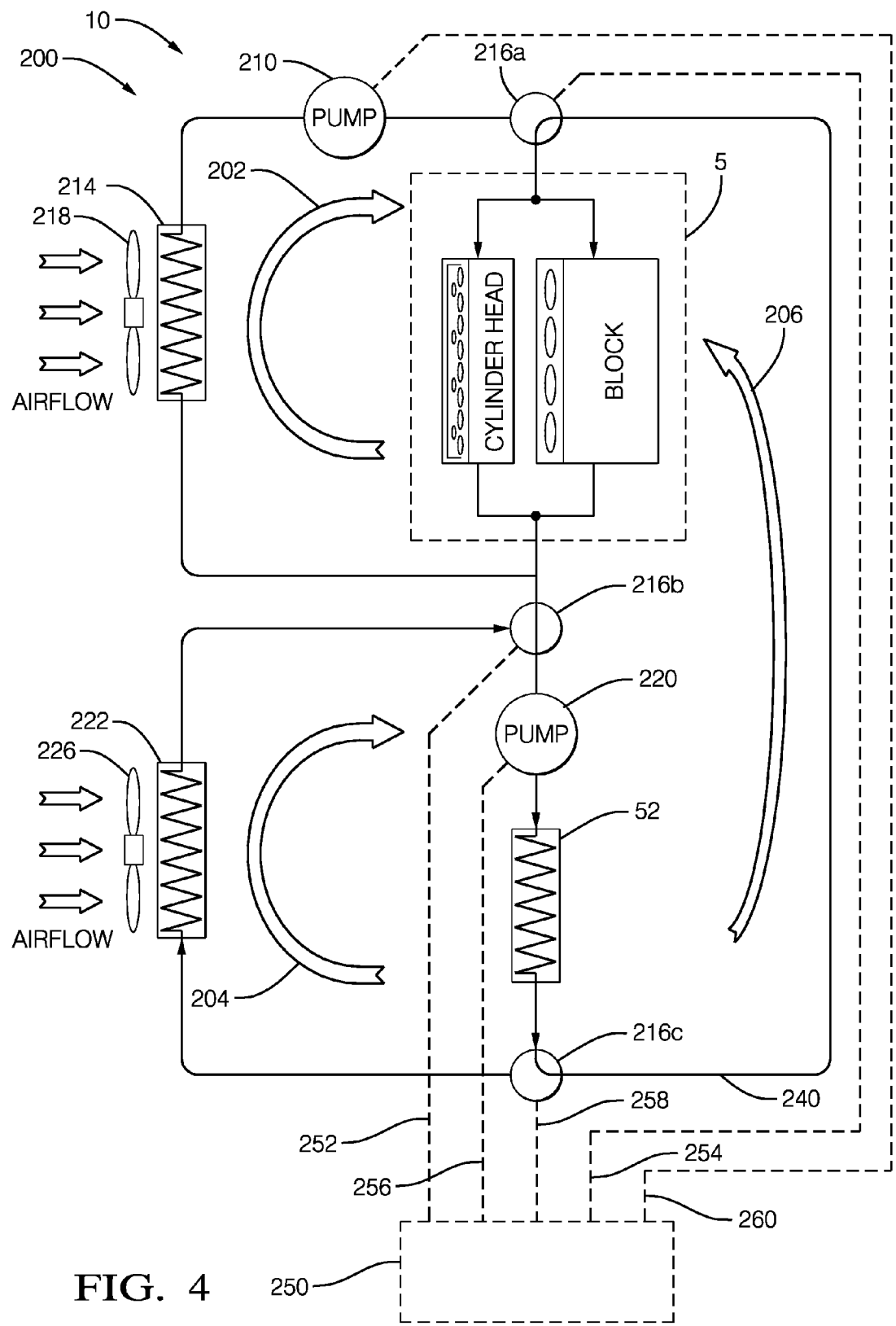
FIG. 4 is a depiction of a coolant system including a coolant valve means in a second configuration.

The first three-way coolant valve 216a, the second three-way coolant valve 216b, and the third three-way coolant valve 216c shown in the embodiment of FIG. 3 and FIG. 4 may be collectively considered as a coolant valve means. It will be appreciated that other embodiments with alternative coolant valve means, possibly including but not limited to two-way valves and/or four-way valves, placed in other locations in the system, may be used to achieve the function described in the claims for the coolant valve means.

The system 10 also includes a controller means 250 operable to control the operation of the second coolant pump 220 by way of the control line 256. The controller means 250 is also operable to control the positions of first three-way coolant valve 216a, the second three-way coolant valve 216b, and the third three-way coolant valve 216c by way of the control lines 254, 252, and 258 respectively. If the first coolant pump 210 is an electrically driven pump, the controller means 250 is also operable to control the operation of the first coolant pump 210 by way of the control line 260. Although not shown in the Figures, it will be appreciated that the controller means 250 may also be configured to control the first air supply means 218 and the second air supply means 226, as well as the supercharger clutch 40, the supercharger bypass valve 42, the charge air cooler bypass valve 44, the EGR valve 66, and the backpressure valve 68 shown in FIG. 1 and/or FIG. 2. It will also be appreciated that the controller means 250, while shown a single entity in FIG. 3 and FIG. 4, may have its functions distributed among a plurality of controllers.

FIG. 3 depicts the coolant side 200 of the system 10 with the coolant valve means 216a, 216b, 216c positioned to provide a first configuration for the coolant side 200. In this configuration, the coolant valve means 216a, 216b, 216c are positioned such that the first coolant pump 210 supplies coolant through the first coolant loop 202, that is, coolant flows from the first coolant pump 210 through coolant passages in the cylinder head and the block of the engine 5, through the first radiator 214, through the first three-way coolant valve 216a and back to the inlet of the first coolant pump 210. The first coolant loop as shown in FIG. 3 is essentially a conventional coolant loop used in cooling internal combustion engines. The first coolant pump 210 may be a mechanical pump driven by the engine, with a flow rate that is related to engine speed. Alternatively the first coolant pump 210 may be an electrically driven pump, with a flow rate that is related to electrical drive to the pump. The controllable first air supply means 218 may be controlled so as to remove heat from the coolant flowing through the first radiator 214 to achieve a target coolant temperature in the first coolant loop 202.

In the first configuration as shown in FIG. 3, the second coolant pump supplies coolant through the second coolant loop 204, that is, coolant flows from the second coolant pump 220, the charge air cooler 52, through the three-way coolant valve 216c, through the second radiator 222, through the second three-way coolant valve 216b, and back to the inlet of the second coolant pump 220. The second coolant pump 220 may be a variable speed pump driven by an electric motor. The second coolant pump 220 and/or the second air supply means 226 may be controlled so as to remove heat from the coolant flowing through the second radiator 222 to achieve a target coolant temperature in the second coolant loop 204. By way of nonlimiting example, the controllable second air supply means 226 may be a variable speed fan, with the speed of the fan 226 and/or the speed of the second coolant pump 220 controlled to achieve a target coolant temperature at the inlet of the charge air cooler 52.

FIG. 4 depicts the coolant side 200 of the system 10 with the coolant valve means 216a, 216b, 216c positioned to provide a second configuration for the coolant side 200. It will be appreciated that FIG. 4 differs from FIG. 3 only in the representation of the internal flow paths within the coolant valve means 216a, 216b, 216c. In this second configuration, coolant valve means 216a, 216b, 216c are positioned so as to define a third coolant loop 206. In the second valve configuration as shown in FIG. 4, the second coolant pump 220 supplies coolant through the third coolant loop 206, that is, coolant flows from the second coolant pump 220 through the charge air cooler 52, through the third three-way coolant valve 216c, through the conduit 240, through the first three-way coolant valve 216a from the third port 232 to the second port 230 through coolant passages in the cylinder head and the block of the engine 5, through the second three-way coolant valve 216b, and back to the inlet of the first coolant pump 210.

Under normal engine operation the coolant valve means 216a, 216b, 216c will be positioned in the first configuration, i.e. the configuration of FIG. 3. In this configuration the coolant in the first coolant loop 202 will draw heat from the engine 5 and reject that heat into the atmosphere by way of the first radiator 214. The target coolant temperature in the first coolant loop 202 may be approximately 80° C.

Under normal engine operation the second coolant loop 204, as well as the supercharger clutch 40, the supercharger bypass valve 42, the charge air cooler bypass valve 44, the EGR valve 66, and the backpressure valve 68 shown in FIG. 1 and FIG. 2 are controlled so as to provide intake air to the charge air intake port 58 of the engine 5 at a desired temperature, pressure, and oxygen content. This is typically achieved with a coolant temperature in the second coolant loop 204 of about 40° C. In normal engine operation, excess heat may be removed from the intake air to the coolant in the second coolant loop 204 by way of the charge air cooler 52. The second coolant loop 204 may be considered a low temperature loop compared to the first coolant loop 202 (high temperature loop).

During start-stop engine operation it is desirable to have heated air available at the charge intake port 58 of the engine 5 to restart the engine 5. The second configuration of the coolant valve means 216a, 216b, 216c as shown in FIG. 4 allows enhanced heating of the intake air to the engine. When the engine is stopped during start-stop operation, the coolant valve means 216a, 216b, 216c is placed in the second valve configuration. In the second valve configuration as shown in FIG. 4, the second coolant pump 220 supplies coolant through the third coolant loop 206, that is, coolant flows from the second coolant pump 220 through the charge air cooler 52, through the third three-way coolant valve 216c, through the conduit 240, through the first three-way coolant valve 216a from the third port 232 to the second port 230 through coolant passages in the cylinder head and the block of the engine 5, through the second three-way coolant valve 216b, and back to the inlet of the second coolant pump 220.

In the second configuration of the coolant valve means the coolant in the third coolant loop 206 receives heat from the engine 5, but does not pass through either the first radiator 214 or the second radiator 222. As a result, the coolant in the third coolant loop 206 in the second configuration of the coolant valve means will reach a higher temperature than the coolant temperature in the second coolant loop 204 in the first configuration of the coolant valve means. The charge air cooler 52 will be heated by the hotter coolant flowing through the third coolant loop 206. When engine restart is desired and the engine is cranked, the charge air cooler 52 will serve to provide heat to the intake air charge flowing therethrough to aid in restarting the engine. Subsequently the coolant valve means can be returned to the first configuration as shown in FIG. 3 for normal engine running.

In a second aspect of the present invention, a method for controlling the previously described system is presented. The method includes the steps of placing the coolant valve means into the first configuration when the engine is running, and placing the coolant valve means into the second configuration when the engine is stopped.

If the first coolant pump 210 is a mechanical pump driven by rotation of the engine 5, the first coolant pump 210 will stop when the engine is stopped, and there is no concern about deadheading the pump 210 when the coolant valve means is in the second configuration. If the first coolant pump 210 is an electrically driven pump, the method of the present invention may include the step of turning off the first coolant pump 210 when the engine is stopped.

The system and method described herein can provide heated intake air to an engine, making start-stop operation of a compression ignition engine practical. This system and method do not have the disadvantages of slow response time and increased parasitic load that would be encountered using an electric heater to provide heat to the intake air at engine restart.

While this invention has been described in terms of preferred embodiments thereof, it is not intended to be so limited, but rather only to the extent set forth in the claims that follow.

The invention claimed is:

1. A system for controlling the temperature of intake air to an engine, the system comprising:
   an engine having coolant passages defined therethrough;
   a first coolant pump;
   a first radiator;
   a second coolant pump;
   a second radiator;
   a liquid-to-air heat exchanger configured to condition the temperature of intake air to the engine; and
   a coolant valve means;
   wherein the system is configured such that for a first configuration of the coolant valve means a first coolant loop is defined wherein the first coolant pump is configured to urge coolant through the coolant passages in the engine and through the first radiator, and a second coolant loop is defined wherein the second coolant pump is configured to urge coolant through the liquid-to-air heat exchanger and through the second radiator;
   and wherein the system is further configured such that for a second configuration of the coolant valve means a third coolant loop is defined wherein the second coolant pump is configured to urge coolant through the coolant passages in the engine and through the liquid-to-air heat exchanger without urging coolant through the first radiator and without urging coolant through the second radiator.

2. The system according to claim 1, further comprising a controller means configured to place the coolant valve means in the second configuration when the engine is stopped.

3. The system according to claim 1, wherein the second coolant pump is operable to urge coolant therethrough when the engine is stopped.

4. A method for controlling a system, the system comprising:
   an engine having coolant passages defined therethrough;
   a first coolant pump;
   a first radiator;
   a second coolant pump;
   a second radiator;
   a liquid-to-air heat exchanger configured to condition the temperature of intake air to the engine; and
   a coolant valve means;
   wherein the system is configured such that for a first configuration of the coolant valve means a first coolant loop is defined wherein the first coolant pump is configured to urge coolant through the coolant passages in the engine and through the first radiator, and a second coolant loop is defined wherein the second coolant pump is configured to urge coolant through the liquid-to-air heat exchanger and through the second radiator;
   and wherein the system is further configured such that for a second configuration of the coolant valve means a third coolant loop is defined wherein the second coolant pump is configured to urge coolant through the coolant passages in the engine and through the liquid-to-air heat exchanger without urging coolant through the first radiator and without urging coolant through the second radiator;
   the method comprising the steps of:
   configuring the coolant valve means in the first configuration when the engine is running, and
   configuring the coolant valve means in the second configuration when the engine is stopped.

5. The method according claim 4, wherein the first coolant pump is an electrically driven pump, the method further including the step of turning off the first coolant pump when the engine is stopped.

* * * * *